United States Patent [19]

Yoden et al.

[11] Patent Number: 4,533,358

[45] Date of Patent: Aug. 6, 1985

[54] PROCESS FOR PRODUCING A SHAPED PRODUCT OF COLLAGEN BY SYNERESIS

[75] Inventors: Yoshimasa Yoden; Tsuneo Okuda, both of Osaka; Eiji Fuchigami; Toshihiro Kuwabara, both of Nara, all of Japan

[73] Assignee: Nitta Gelatin Co., Ltd., Osaka, Japan

[21] Appl. No.: 632,855

[22] Filed: Jul. 20, 1984

[30] Foreign Application Priority Data

Sep. 29, 1983 [JP] Japan .................................. 58-182437

[51] Int. Cl.³ ............................ C14C 5/00; C14C 11/00
[52] U.S. Cl. ........................................ 8/94.2; 8/94.11;
8/94.19 R; 8/94.33; 426/105; 426/277;
426/278; 426/513
[58] Field of Search ..................... 8/94.33, 94.11, 94.2

[56] References Cited

U.S. PATENT DOCUMENTS

| 4,196,223 | 4/1980 | Shank ................................ 8/94.33 |
| 4,239,492 | 12/1980 | Holman et al. .................... 8/94.11 |
| 4,240,794 | 12/1980 | Holman et al. .................... 8/94.11 |
| 4,383,832 | 5/1983 | Fraefel et al. ...................... 8/94.11 |
| 4,405,327 | 9/1983 | Pollock .............................. 8/94.11 |

*Primary Examiner*—A. Lionel Clingman
*Attorney, Agent, or Firm*—Wenderoth, Lind & Ponack

[57] ABSTRACT

A process for producing a shaped product of collagen by a wet or electrochemical method from a pasty composition comprising a collagenous substance or a mixture thereof with another high molecular substance. The composition or a product shaped therefrom is treated with a crosslinking agent, and the shaped product is frozen, and thawed.

8 Claims, No Drawings

PROCESS FOR PRODUCING A SHAPED PRODUCT OF COLLAGEN BY SYNERESIS

BACKGROUND OF THE INVENTION

1. Field of the Invention

This invention relates to a process for producing a shaped product of collagen by syneresis.

2. Description of the Prior Art

There are known various kinds of shaped products consisting mainly of collagen. They are, for example, tubular products such as sausage casings, threadlike or stringy products such as sutures, spongy or feltlike products such as medical sponge, and tapes and sheets which are usable for a wide variety of applications.

A shaped product of collagen is formed from a pasty composition prepared by finely devided fibers of connective tissue containing collagen, such as the skin or tendons of an animal, and/or solubilized collagen or by the addition of one or more of fibrous materials, proteins, polysaccharides and synthetic high molecular materials to a collagenous substance. The product is obtained by a wet method such as the extrusion of the composition into a salt solution or by an electrochemical method such as electrodeposition.

A wet shaped product of collagen obtained by a wet or electrochemical method is usually very soft, as it contains a large amount of water. At least 95% of the product is water. The low pressure resistance of the product brings about a lot of difficulty in its drying, especially if it is a tubular product which is dried by the air introduced thereinto. Moreover, a large amount of energy and a correspondingly extensive set of equipment are required for removing a large amount of water from the product.

SUMMARY OF THE INVENTION

It is an object of this invention to provide a process which produces a shaped product of collagen having improved quality.

It is another object of this invention to provide a process which is greatly improved in efficiency for the production of a shaped product of collagen.

These objects are attained by a process which includes applying a crosslinking agent to the composition being shaped or a shaped product, freezing the shaped product and thawing it. The crosslinking agent may be a natural or synthetic crosslinking agent reacting with the amino group in collagen, for example, formaldehyde, glutaraldehyde, glyoxal, dialdehyde starch or a liquid smoke. The freezing of the product enables its crosslinking reaction. According to this invention, it is possible to produce by syneresis a tough shaped product of collagen in the wet state but not containing or absorbing much water, or in the dry state.

DETAILED DESCRIPTION OF THE INVENTION

In the event a wet method is employed, the crosslinking agent may be added to a coagulant when the pasty composition is shaped. Alternatively, it is possible to apply the crosslinking agent after coagulation by spraying a solution thereof onto the shaped product, or dipping it in such a solution, or treating it with the fume or gas of the solution. The product is, then, frozen at a temperature of −5° C. to −40° C., and thawed. In the event an electrochemical method is employed, the shaped product is treated with the crosslinking agent, frozen and thawed.

According to the process of this invention, the separation of water is promoted during the addition of the crosslinking agent and the freezing of the shaped product and takes place immediately upon thawing. Although the reason for this phenomenon still remains to be clarified, it is probably true that the sealing of the amino group in collagen by the crosslinking agent lowers the hydrophilicity of collagen and thereby promotes the separation of water therefrom, and that the separation of several tens percent of water from the shaped product with the progress of its freezing brings about a reduction in the distance between the cross linkages and thereby enables achievement of an improved crosslinking effect.

In any event, the separation of a lot of water makes it possible to obtain by the process of this invention a tough shaped product of collagen in the wet state but not containing or absorbing any appreciable amount of water, and which can be used in the wet state, depending on the purpose. Although the product shaped by syneresis in accordance with this invention is usually in the shape of a tube, sheet, tape or string, the process is also useful for shaping a product in the form of a thin film or thread. The process of this invention, therefore, enables the production of shaped products which are not only excellent in properties, but also available in a wide variety of special shapes. This invention enables a drastic reduction in the time required for coagulation and washing with water in the event a wet method is employed for shaping.

Moreover, the wide-angle X-ray diffraction of a dry shaped product obtained by the process of this invention does not reveal any crystal structure, but confirms that it has a very high affinity for coloring matter having a bulky structure, such as Erythrosine. A shaped product obtained by treatment with a crosslinking agent and drying without being frozen, however, has a crystal structure, and its affinity for coloring matter having a bulky structure is low.

According to this invention, it is possible to use additionally a crosslinking agent which is not reactive with the amino group in collagen, e.g. alum.

The invention will now be described in further detail with reference to several examples thereof.

EXAMPLE 1

A fresh corium layer of oxhide from which the hair had been removed was cut into 10 cm square pieces, and they were dipped for 10 days in two parts of 0.4% lime milk per part of the corium. The material thus treated was washed by water and neutralized by hydrochloric acid. The material was, then, refined by dipping for five hours in two parts of a 1% aqueous solution of ammonium chloride per part of the corium and washing in flowing water. The refined material was ground by a meat grinder including a plate provided with holes having a diameter of 1 mm, whereby collagen fibers were obtained.

An aqueous suspension containing the corium at a solid concentration of 8.0% and sodium hydroxide at a concentration of 3.0% was prepared from 20% by weight of the collagen fibers, and kept at a temperature of 20° C. plus or minus 1° C. for two days. This treatment solubilized the collagen and formed an emulsion thereof. Hydrochloric acid was added to the emulsion at a temperature not exceeding 20° C. to lower its pH value to 4.0 and cause the precipitation of a fibrous agglomerate, and the agglomerate was dehydrated. The remainder (80% by weight) of the collagen fibers was added to the dehydrated product. They were swollen in an aqueous solution of citric acid having a pH value of 3.0 at a solid corium concentration of 3.5% and mixed together homogeneously. The homogeneous mixture was passed through a Manton Gaulin type homogenizer to form a pasty composition.

The pasty composition was extruded into a coagulating solution through an annular nozzle device comprising a pair of dies having a nozzle spacing of 0.5 mm and a diameter of 17 mm and adapted for rotation in mutually opposite directions. The coagulating solution was a 20% saline solution containing 1000 ppm of glutaraldehyde, having its pH value adjusted to 9.5 by sodium hydroxide and having a temperature of 20° C. The tube as extruded had a pH value of 3.6, and was left in the coagulating solution for 20 minutes until its pH value rose to 9.0.

After the tube had been washed by flowing water for 10 minutes, it was immediately placed in a freezer having a temperature of $-20°$ C., and kept frozen for five hours. The tube had a water content of 96% and a burst strength of 600 mm Aq/cm$^2$ before it was frozen. When it was frozen and thawed, its water content was 75%. This means the removal of 88% of the absolute quantity of water which the tube contained prior to freezing. The freezing and thawing of the tube increased its pressure resistance to 1500 mm Aq/cm$^2$. The tube did not show any appreciable change in weight when it had been caused to absorb water for 60 minutes. The wet tube was filled with sausage meat, dried at 75° C. for 20 minutes and boiled at 80° C. for 20 minutes to make a sausage. The sausage was cooked in a frying pan and the tube was not broken.

The process of this invention showed excellent results in the production of not only wet tubes, but also dry tubes. Although a tube made by the conventional process without freezing required 20 minutes for drying, the tube formed by the process of this invention including freezing took only two minutes for drying. According to this invention, it was not necessary at all to employ any cellulose or other substance for preventing the shrinkage of the tube upon drying. Moreover, the improved strength of the tube obtained by freezing made it possible to realize a dry tube wall thickness of 25 microns, while it was impossible to reduce the wall thickness to less than, say, 40 microns in accordance with the prior art. This reduction in wall thickness enabled the production of a sausage casing which was closer to a natural intestinal casing in twisted form and taste. The dry tube of this invention was filled with sausage meat, and could be boiled at 80° C. for 20 minutes without breaking, though it had not been dried or smoked.

EXAMPLE 2

The procedure of EXAMPLE 1 were repeated for preparing a pasty composition. It was extruded through a hole having a diameter of 0.5 mm into a coagulating solution containing 2% of potassium alum and 20% of salt and having a pH value of 4.5 to form a stringy product. It was left for solidification for 10 minutes, and washed by flowing water for 10 minutes. There was obtained a product having a water content of 96%, and which was low in strength and difficult to dry. It was, then, kept frozen for 24 hours in a freezer having a temperature of $-25°$ C. When the product was thawed, it had a water content of 92% and a solid salt content of 1.3%. The product was allowed to absorb water for 60 minutes, and showed an increase of 50% in weight.

Another stringy product was dipped in a 1% glyoxal solution immediately (within 10 seconds) after extrusion, and left therein for a minute. Then, it was kept frozen at a temperature of $-15°$ C. for 20 hours. When it was thawed, it had a water content of 80% and a solid salt content of 2%. It was allowed to absorb water for 60 minutes, and showed an increase of 10% in weight. This product was tough, and required for drying only a half of the time required for drying the product frozen without being treated with glyoxal. The treatment of the product prior to its freezing enabled a drastic reduction in solidification time and the omission of the washing step. The product had a solid salt content of 40% immediately after extrusion, or when it had been allowed to solidify for 10 seconds after extrusion.

EXAMPLE 3

The procedures of EXAMPLE 1 were repeated for preparing finely divided collagen fibers. They were used to form a pasty composition having a solid corium content of 0.6% and a pH value of 3.6 and containing 0.2% of propylene glycol alginate, while not containing solubilized collagen. The pasty composition was degassed carefully, and a pair of parallel stainless steel plate electrodes having a distance of 5 cm therebetween were placed in the composition. A DC voltage of 50 V was applied across the electrodes for 85 seconds at 20° C., and a wet layer of collagen formed thereby on the cathode was continuously drawn up to yield a shaped product in the form of a sheet having a thickness of about 1 to 2 mm. The product had a water content of 98%, and was soft and weak.

The shaped product was dipped in a solution containing 500 ppm of glutaraldehyde for a minute, and frozen at a temperature of $-10°$ C. for 18 hours. When the product was thawed, it was a tough sheet having a thickness of about 0.1 to 0.2 mm and a water content of 80%. When it was allowed to absorb water for 60 minutes, it showed an increase of 10% in weight. It was easy to dry to form a dry shaped product in the form of a sheet having a thickness of 20 microns.

EXAMPLE 4

The procedures of EXAMPLE 1 were repeated for preparing finely divided collagen fibers. Four liters of a causic soda solution having a pH value of 11 and 2.5 liters of an aqueous solution containing 57 g of sodium polyacrylate and 15 g of a copolymer of polyvinyl methyl ether and maleic anhydride were added to 1 kg of the collagen fibers. The fibers were dispersed carefully by a homogenizer to prepare a pasty composition. The pasty composition was extruded through a slit having a width of 0.5 mm into a 20% aluminum sulfate solution, and allowed for solidification for 10 minutes. The solidified composition was washed by flowing water for five minutes to yield a shaped product in the form of a tape. The product had a water content of 95%. A sausage liquid smoke was sprayed onto the product for a minute, and it was frozen at a temperature of $-30°$ C. for 20 hours. When the product was thawed, it had a water content of 80%, and when it had been allowed to absorb water for 60 minutes, it showed an increase of 10% in weight. The frozen product required for drying only one-fifth of the time required for drying the unfrozen product, and yielded a thin and tough product in the form of a tape.

EXAMPLE 5

A pasty composition, which had been prepared in accordance with the procedures of EXAMPLE 1, was extruded into a coagulating solution through an annular nozzle device having a nozzle width of 0.7 mm and a diameter of 25 mm and comprising an inner member and an outer member adapted for rotation in mutually opposite directions. The solution had a pH value of 4.5 and contained 1.5% of potassium alum, 30% of a sausage liquid smoke and 20% of salt. The extruded product was allowed to solidify for eight minutes, and washed in flowing water for five minutes to yield a tubular product. It had a water content of 95% and a burst strength of 500 mm Aq/cm$^2$. The product was frozen at a temperature of $-10°$ C. for 20 hours. When it had been thawed, it had a water content of 85%. When it had been allowed to absorb water for 60 minutes, it showed an increase of 20% in weight and had a pressure resistance of 1200 mm Aq/cm$^2$. Its drying required only one-eighth of the time required for drying the unfrozen product. The resulting dry tubular product having a wall thickness of 25 microns was filled with sausage meat, and dried at 75° C. for 30 minutes. It was, then, smoked at 60° C. for 45 minutes in a smoking house to yield a sausage. It had a satisfactorily smoked color, and could be fried in a large quantity of oil without shrinking very much.

EXAMPLE 6

The procedures of EXAMPLE 3 were repeated for forming a shaped product in the shape of a sheet having a thickness of about 1 to 2 mm from a wet layer of collagen on the cathode. It was smoked with cherry wood at 70° C. for two minutes, and frozen at $-10°$ C. for 18 hours. When it had been thawed, it formed a tough sheet having a thickness of about 0.1 to 0.2 mm. It was dried to yield a sheet product having a thickness of 20 microns.

COMPARATIVE EXAMPLE

A dry tubular product having a wall thickness of 25 microns, which had been prepared in accordance with the procedures of EXAMPLE 5, was filled with sausage meat to form a sausage. It was dried at 75° C. for 20 minutes and cooked with steam at 75° C. for 30 minutes. The cooked product was dipped in a 1% solution containing equal proportions of erythrosine and norbixin at 70° C. for a minute to yield a vividly colored sausage.

A tubular product obtained by extrusion through an annular nozzle, solidifying for eight minutes and washing for five minutes in accordance with the procedures of EXAMPLE 5 was dried by hot air immediately without being frozen. It was filled with sausage meat, dried at 75° C. for 20 minutes and cooked with steam at 75° C. for 30 minutes to prepare a sausage. It was dipped in a 1% solution containing erythrosine and norbixin at 70° C. for a minute. It was, however, not satisfactorily colored at all, but was only yellowish as a whole. The wide-angle X-ray diffraction of this product revealed a peak of crystallinity at 4.6 Å due to the surface distance between the adjoining collagen molecules, and at 2.8 Å due to the recurring amino acid residues.

The same wide-angle X-ray diffraction of the dry tubular product obtained in accordance with the procedures of EXAMPLE 5 and having a wall thickness of 25 microns confirmed the absence of any such peak of crystallinity and the presence of an amorphous structure. This difference coincides with a difference in the adsorbability of bulky coloring matter, such as erythrosine.

A natural sheep intestine, which had long been used for a sausage casing, showed visual dyeing test results comparable to those on the product of this invention. Its wide-angle X-ray diffraction confirmed the absence of any peak of crystallinity at 4.6 Å.

What is claimed is:

1. In a process for producing a shaped product of collagen by a wet or electrochemical method from a pasty composition comprising a collagenous substance or a mixture thereof with another high molecular substance, the improvement which comprises treating said composition with a crosslinking agent when said composition is shaped, freezing a shaped product and thawing it.

2. In a process for producing a shaped product of collagen by a wet or electrochemical method from a pasty composition comprising a collagenous substance or a mixture thereof with another high molecular substance, the improvement which comprises treating with a crosslinking agent a product shaped from said composition, freezing said shaped product and thawing it.

3. A process as set forth in claim 1, wherein said composition comprises collagen fibers obtained by dividing finely connective tissue containing collagen.

4. A process as set forth in claim 3, wherein said composition further contains solubilized collagen.

5. A process as set forth in claim 3, wherein said composition further contains at least one substance selected from the group consisting of natural and synthetic fibers, proteins, seaweeds extracts, polysaccharides and synthetic water-soluble high molecular substances.

6. A process as set forth in claim 2, wherein said composition comprises collagen fibers obtained by dividing finely connective tissue containing collagen.

7. A process as set forth in claim 4, wherein said composition further contains at least one substance selected from the group consisting of natural and synthetic fibers, proteins, seaweed extracts, polysaccharides and synthetic water-soluble high molecular substances.

8. A process as set forth in claim 1 or claim 2 wherein said composition is shaped and frozen at a temperature in the range of $-5°$ C. to $-40°$ C. and thawed.

* * * * *